(12) United States Patent
Masemore et al.

(10) Patent No.: US 7,329,329 B2
(45) Date of Patent: Feb. 12, 2008

(54) APPARATUS FOR PYROLYZING TIRE SHREDS AND TIRE PYROLYSIS SYSTEMS

(75) Inventors: Blaine Masemore, Bethlehem, PA (US); Robert Zarrizski, Whitehall, PA (US)

(73) Assignee: Renaissance Energy Group, Inc., Wilmington, DE (US)

( * ) Notice: Subject to any disclaimer, the term of this patent is extended or adjusted under 35 U.S.C. 154(b) by 493 days.

(21) Appl. No.: 10/768,521

(22) Filed: Jan. 30, 2004

(65) Prior Publication Data

US 2004/0182001 A1    Sep. 23, 2004

Related U.S. Application Data

(62) Division of application No. 09/737,221, filed on Dec. 14, 2000, now Pat. No. 6,736,940.

(60) Provisional application No. 60/170,554, filed on Dec. 14, 1999.

(51) Int. Cl.
*C10B 1/00*    (2006.01)
*C10B 51/00*    (2006.01)

(52) U.S. Cl. .................... 202/117; 202/118; 201/25

(58) Field of Classification Search ............ 202/117, 202/118; 201/25
See application file for complete search history.

(56) References Cited

U.S. PATENT DOCUMENTS

| | | |
|---|---|---|
| 3,772,242 A | 11/1973 | Liska et al. |
| 3,823,221 A | 7/1974 | Wakefield et al. |
| 3,823,224 A | 7/1974 | Laman et al. |
| 3,907,583 A | 9/1975 | Crane |
| 4,030,984 A | 6/1977 | Chambers |
| 4,062,304 A | 12/1977 | Herbold et al. |
| 4,074,979 A | 2/1978 | Kurisu et al. |
| 4,084,521 A | 4/1978 | Herbold et al. |
| 4,108,730 A | 8/1978 | Chen et al. |
| 4,123,332 A | 10/1978 | Rotter |
| 4,221,608 A | 9/1980 | Beckman |
| 4,235,676 A * | 11/1980 | Chambers .................. 202/118 |
| 4,250,158 A | 2/1981 | Solbakken et al. |

(Continued)

*Primary Examiner*—N. Bhat
(74) *Attorney, Agent, or Firm*—Flaster/Greenberg P.C.

(57) ABSTRACT

Tire pyrolysis systems and processes are provided which include feeding tire shreds to a pyrolysis reactor, pyrolyzing the shreds in a pyrolysis reactor to produce a hydrocarbon-containing gas stream and carbon-containing solid, removing the carbon-containing solid from the reactor, directing the hydrocarbon-containing gas stream into a separator, contacting the hydrocarbon-containing gas stream with an oil spray in the separator thereby washing particulate from the hydrocarbon-containing gas stream and condensing a portion of the gas stream to oil, removing and cooling the oil from the separator, directing non-condensed gas from the gas stream away from the separator, and directing a portion of the cooled oil removed from the separator to an inlet of the separator for use as the separator oil spray. A process is also provided in which solids from the pyrolysis reactor are directed to an auger having a pressure which is greater than the pressure in the pyrolysis reactor, and in which non-condensed gas from the gas stream after condensing a portion of the gas is directed to at least one burner in heat exchange relation with the pyrolysis reactor, and burned to heat the reactor and generate an effluent flue gas, a portion of which effluent flue gas is cooled and injected into the auger which is a trough auger in one embodiment.

25 Claims, 6 Drawing Sheets

U.S. PATENT DOCUMENTS

| | | |
|---|---|---|
| 4,402,791 A | 9/1983 | Brewer |
| 4,647,443 A | 3/1987 | Apffel |
| 4,648,328 A | 3/1987 | Keough |
| 4,686,007 A | 8/1987 | Lyakhevich et al. |
| 4,726,530 A | 2/1988 | Miller et al. |
| 4,740,270 A | 4/1988 | Roy |
| 4,846,082 A | 7/1989 | Marangoni |
| 4,900,401 A * | 2/1990 | Horton .................. 202/117 |
| 5,037,628 A | 8/1991 | Fader |
| 5,070,109 A | 12/1991 | Ulick et al. |
| 5,229,099 A | 7/1993 | Roy |
| 5,230,777 A | 7/1993 | Jarrell |
| 5,323,714 A | 6/1994 | Cox |
| 5,390,861 A | 2/1995 | Bishop |
| 5,423,950 A | 6/1995 | Avetisian et al. |
| 5,464,503 A | 11/1995 | Avetisian et al. |
| 2002/0117388 A1 | 8/2002 | Denison |

* cited by examiner

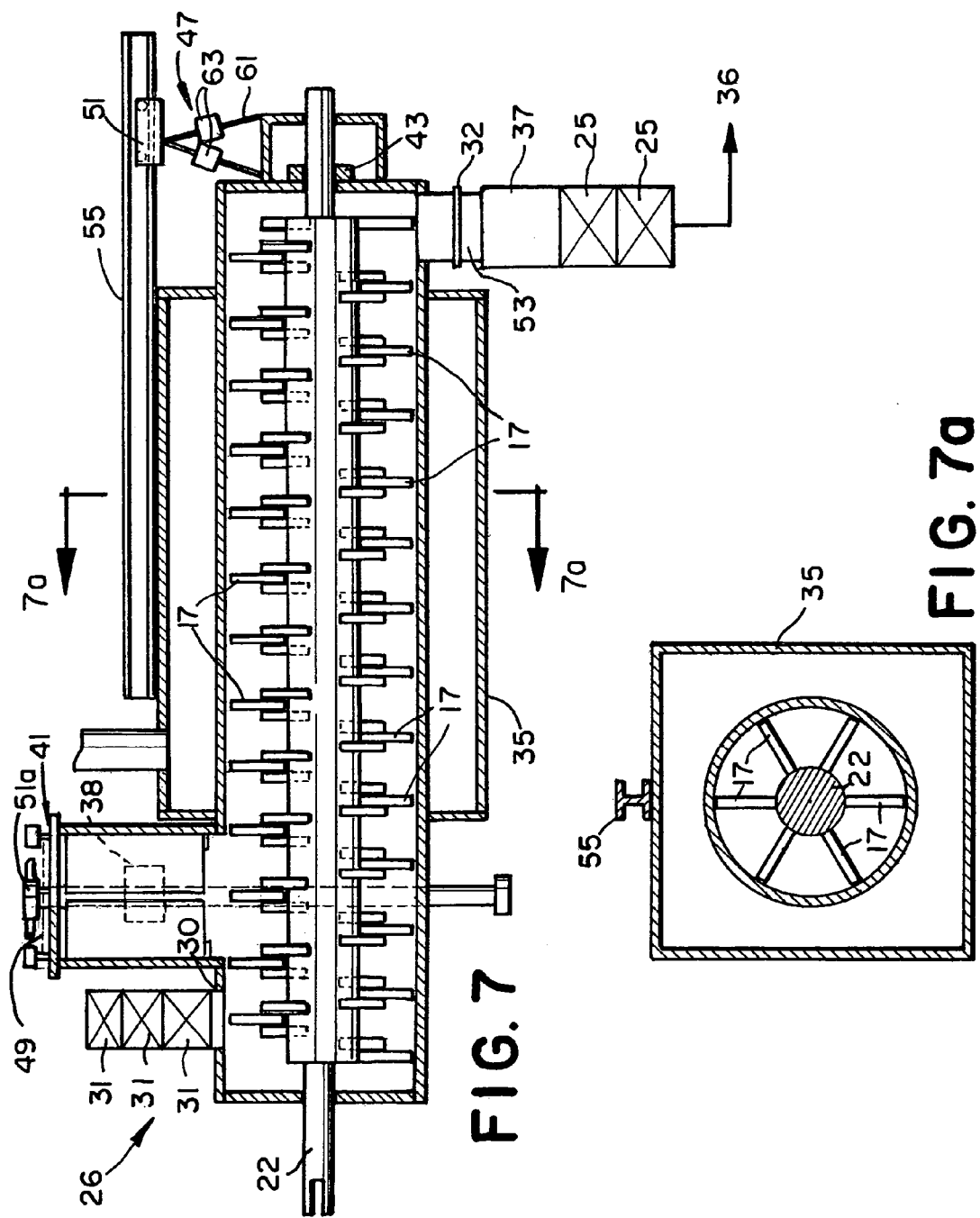

ated Dec. 14, 1999
APPARATUS FOR PYROLYZING TIRE SHREDS AND TIRE PYROLYSIS SYSTEMS

CROSS-REFERENCE TO RELATED APPLICATIONS

This application is a divisional of Application Ser. No. 09/737,221, filed Dec. 14, 2000 now U.S Pat. No. 6,736,940, entitled Process for Pyrolyzing Tire Shreds and Tire Pyrolysis Systems, the entire disclosure of which is incorporated herein by reference and also claims the benefit of U.S. Provisional Application No. 60/170,554 filed Dec. 14, 1999 the entire disclosure of which is also incorporated herein by reference.

BACKGROUND OF THE INVENTION

Used tires include materials that, if successfully recycled, may be used for a wide variety of industrial uses. However, due to the difficulty in recycling these materials, millions of tires every-year are worn out and accumulated. Such used tires if burned cause air pollution. Burying tires leads to landfill contamination. Further, since waste tires are bulky, they take up a significant amount of space, even if compacted. Stockpiling of tires and special treatment of tires in landfills further requires a much more costly operation than disposal of other types of solid waste, such that landfill operators tend to exact a higher charge for disposal of such materials. Such high costs lead to indiscriminate dumping which causes many environmental hazards, from mosquito breeding grounds in the pooling of water within tires to fire hazards since burning tires are very difficult to extinguish as well as a significant eyesore on the landscape.

Tire recapping has declined due to the tendency of more people to prefer steel belted radials. Such tires are more difficult to recap so that most of these tires end up in landfills. Such tires are also more difficult to further process for recycling. Retreading of tires is also not commonly performed on waste tires since the processes are not universally useful on all tires, are still costly and are difficult for steel belted radials. While there have been other uses for used tires, such as for artificial underwater reefs, crash barriers, road building, playground surfaces and the like, these uses still do not satisfactorily use the large number of waste tires generated each year.

Tire pyrolysis processes are known in which tires are destructively heated in the absence of oxygen to produce useful end products such as oils, gases and carbon black. However, there is difficulty in achieving commercial viability for such processes since the costs of recovering the end products is more costly than the costs associated with deriving these materials directly from petroleum. Further, the quality of the carbon black achieved is typically not commercially acceptable. Further, processing problems arise in that pyrolysis results in the generation of fumes that are flammable in the presence of oxygen. Also, under certain conditions, undesired gaseous byproducts may be formed. It has also been difficult to make beneficial use of the end products of pyrolysis for several reasons, including low yields (which render some prior art processes not economically feasible), and poor quality end products (which limits the market for re-sale of such end products). This is particularly true for carbon black end products from pyrolysis which tend to have high levels of volatiles.

Accordingly, there is a need in the art for a tire pyrolysis process which produces marketable carbon and fuel products, and which is economical and commercially viable.

BRIEF SUMMARY OF THE INVENTION

The invention includes a process for pyrolyzing tire shreds, which comprises: (a) feeding tire shreds to a pyrolysis reactor; (b) pyrolyzing the tire shreds in a pyrolysis reactor to produce a gas stream comprising hydrocarbon and a solid comprising carbon; (c) removing the solid comprising carbon from the pyrolysis reactor; (d) directing the gas stream comprising hydrocarbon into a separator; (e) contacting the gas stream comprising hydrocarbon with an oil spray in the separator thereby washing particulate from the gas stream and condensing a portion of the gas stream to oil; (f) removing and cooling the oil from the separator; (g) directing non-condensed gas from the gas stream comprising hydrocarbon away from the separator; and (h) directing a portion of the cooled oil removed from the separator to an inlet of the separator for use as the oil spray in the separator.

Also included within the invention is a process for pyrolyzing tire shreds, comprising: (a) feeding tire shreds to a pyrolysis reactor; (b) pyrolyzing the tire shreds in a pyrolysis reactor to produce a gas stream comprising hydrocarbon and a solid comprising carbon; (c) removing the solid comprising carbon from the pyrolysis reactor; (d) directing the gas stream comprising hydrocarbon from the pyrolysis reactor to a separator for condensing a portion of the gas stream comprising hydrocarbon; (e) directing the solid comprising carbon removed from the pyrolysis reactor into an auger having a pressure in the auger which is greater than a pressure in the pyrolysis reactor; (f) directing a portion of non-condensed gas from the gas stream after step (d) to at least one burner in heat exchange relation with the pyrolysis reactor; (g) burning the non-condensed gas from the gas stream in the at least one burner to heat the pyrolysis reactor and thereby generating an effluent flue gas; (h) extracting a portion of the effluent flue gas; (i) cooling the extracted portion of the effluent flue gas; and (j) injecting the cooled portion of the effluent flue gas into the auger.

A tire pyrolysis system is also included in the invention. The system comprises (a) a pyrolysis reactor having a tire shreds inlet, a solids removal outlet and a gas stream removal outlet; (b) at least one heating element in heat exchange relation with the pyrolysis reactor; (c) a separator having a gas stream inlet in communication with the gas stream removal outlet of the pyrolysis reactor, a liquid outlet, at least one oil sprayer having a sprayer inlet in an upper portion of the separator and a non-condensed gas outlet; and (d) an auger having an inlet and an outlet, the inlet of the auger being in communication with the solids removal outlet of the pyrolysis reactor.

The invention further includes a tire pyrolysis system comprising: (a) a pyrolysis reactor having a tire shreds inlet, a solids removal outlet and a gas stream removal outlet; (b) at least one burner in heat exchange relation with the pyrolysis reactor and having a gas inlet and an effluent gas outlet; (c) a separator having a gas stream inlet in communication with the gas stream removal outlet of the pyrolysis reactor, a liquid outlet, and a non-condensed gas outlet in communication with the gas inlet of the as least one burner; and (d) an auger having an inlet and an outlet, the inlet of the auger being in communication with the solids removal outlet of the pyrolysis reactor system, wherein the effluent gas outlet of the at least one burner is in fluid communication with an inlet of a heat exchanger for cooling effluent gas from the at least one burner and the heat exchanger has an outlet in fluid communication with the auger such that cooled effluent gas can be injected into the auger.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, like numerals are used to indicate like elements throughout. In the drawings:

FIG. 7 is a cross sectional view of a pyrolysis reactor in accordance with one embodiment of the invention; and FIG. 7a is a cross-sectional view of the pyrolysis reactor of FIG. 7 taken along line 7a-7a.

DETAILED DESCRIPTION OF THE INVENTION

Figure 1:
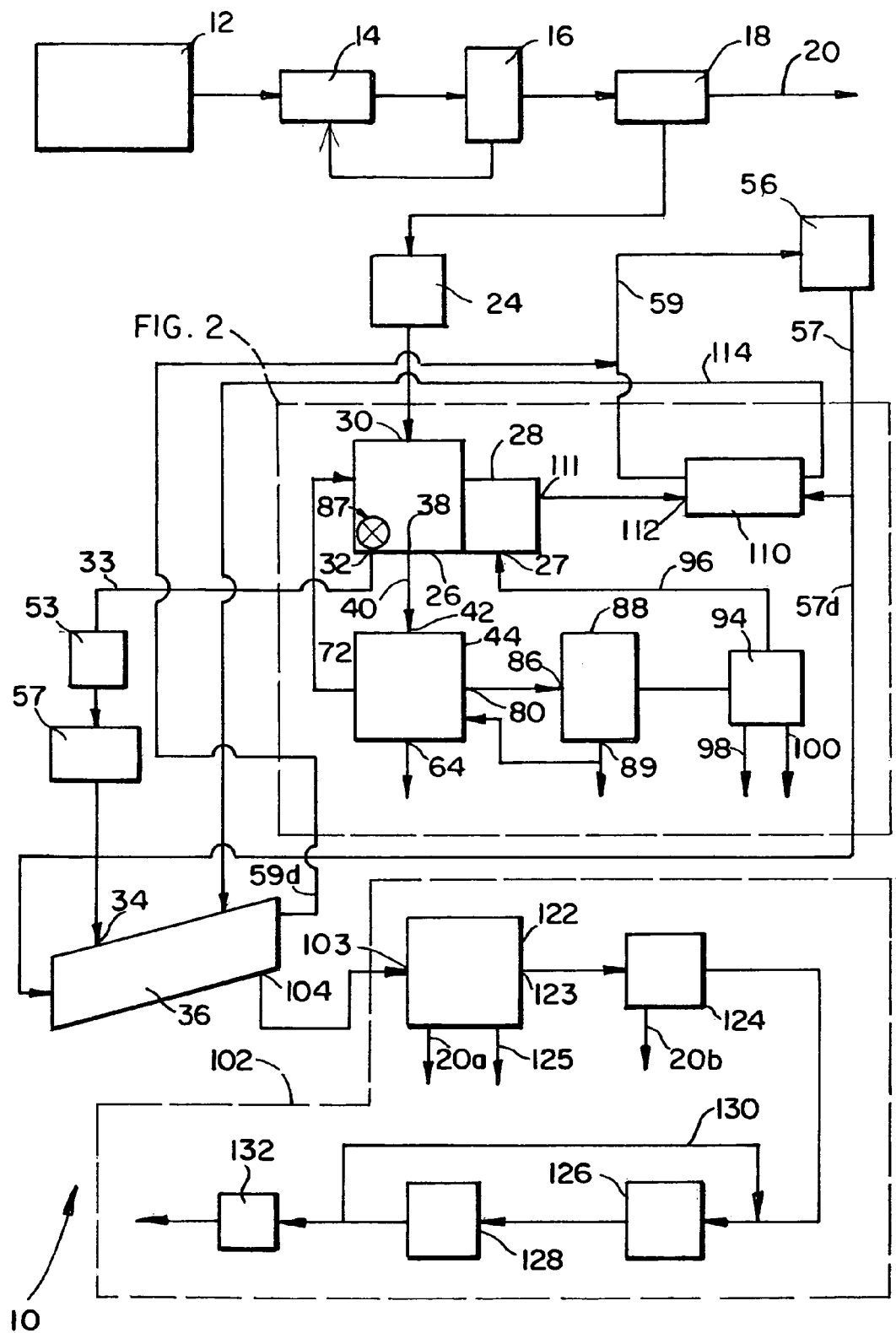
FIG. 1 is a schematic representation of a process for pyrolyzing tires according to the invention.

The present invention includes processes and systems for tire pyrolysis. Certain terminology is used in the following description for convenience only and is not limiting. The words "lower" and "upper," "top" and "bottom," "upward" and "downward," and "inward" and "outward" designate directions in the drawings to which reference is made. The terminology includes the words above specifically mentioned, derivatives thereof and words of similar import.

Figure 2:
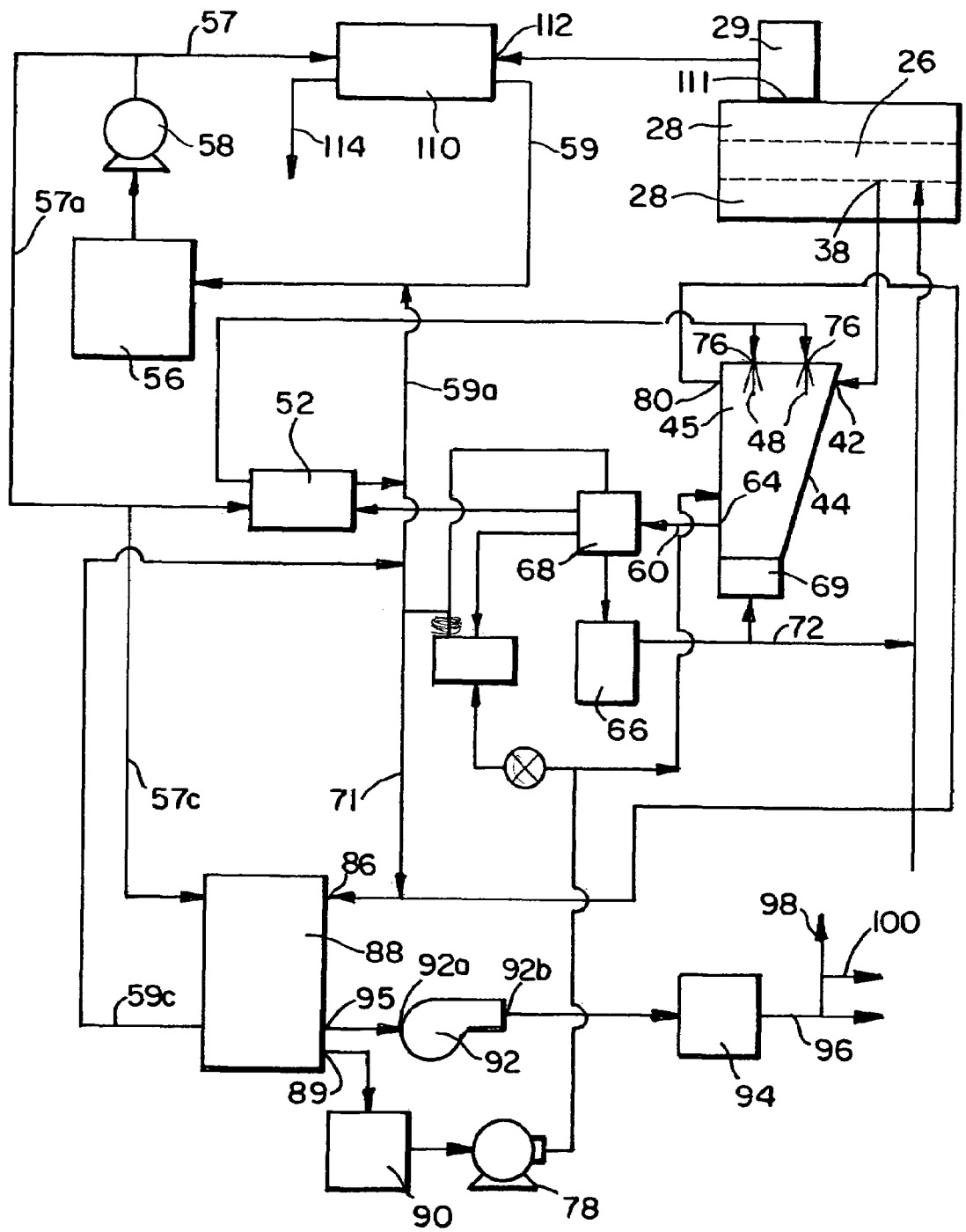
FIG. 2 is a schematic representation of the oil separation section of the process of FIG. 1.

Referring now to the drawings in detail, there are shown in FIGS. 1 and 2 a tire pyrolysis system for the pyrolyzing of tire shreds, generally identified as 10. The system 10 comprises several general sections, including a tire shreds feeding system as shown generally above the central portion of the system enclosed within broken lines (designated as FIG. 2), a pyrolysis and separation system as shown in greater detail in FIG. 2, and a solids handling system shown at the bottom of FIG. 1 and enclosed within broken lines.

Referring first to the upper portion of FIG. 1 which includes the tire shreds feeding system of the tire pyrolysis system 10, there is shown initially a tire storage area 12. The tires which may be fed to the system 10 of the invention include any type of old or new tires, including steel belted radials, car, truck and other motor vehicle tires, whether in the form of whole tires or tire pieces. Preferably the tire storage area 12 is kept loaded awaiting processing of the tires on a continuous basis.

Tires from the tire storage area 12 are taken, either manually, or more preferably by a conveyor (not shown) or other similar mechanism to a tire shredder 14. The shredder may be any suitable commercial tire shredder such as a Saturn Model 73-46. The tires which are to be fed to the pyrolysis system for recovery are preferably fed in pieces of roughly 2 inches in longest dimension. However, it will be understood that such tire pieces will not be uniform in size. The tire shreds leaving the tire shredder 14 are fed through a screening mechanism, such as a trommel 16. Oversized pieces are removed and returned to the tire shredder. The remaining pieces from the screening mechanism, such as the trommel 16 are preferably subjected to a magnetic mechanism 18, such as a magnetic head pulley to remove bulk amounts of steel mesh. Other suitable magnetic separators may also be used. Steel 20 removed from the process by the magnetic mechanism 18 may be sent to further steel processing or recovery for uses such as steel reinforcing wire and the like in accordance with steel refining methods known or to be developed in the art.

Remaining tire shreds passing out of the magnetic mechanism 18 are then passed through a sizer which allows tire shreds of about 2 inches or smaller to pass on to the feeding mechanism. Larger pieces from the sizer may be returned to the shredder 14. The size may be varied in accordance with preference; however, tire shreds of about 2 inches or smaller have proven to be optimal in the tire shreds pyrolysis system 10 of the invention. Acceptably sized tire shreds leaving the magnetic mechanism 18 are fed by a tire shreds feeding mechanism 24 into a pyrolysis reactor. The tire shreds feeding mechanism 24 is in communication with the tire shreds inlet 30 of the pyrolysis reactor 26. One example of a tire shreds feeding mechanism includes a conveyor belt or other similar device and a weight controller for metering the amount of tire shreds fed into the pyrolysis reactor 26. Alternatively, a preferred device includes an agitated feed hopper preferably having a level controller at the discharge end to control the feed rate and an air cylinder or similar apparatus to agitate the feed stock to prevent bridging or blocking of the outlet such as a commercially available Matcon feed mechanism. Such tire shreds feeding mechanisms are known in the art, and any suitable feeding mechanism may be used, preferably, a vibratory feeder.

The pyrolysis reactor 26 may be a continuous or batch pyrolysis reactor, preferably, the pyrolysis reactor is a continuous pyrolysis reactor. In the preferred embodiment of the invention, the pyrolysis reactor 26 is equipped with a continuous rotating feed mechanism for allowing tire shreds to move through the inside of the reactor 26. Preferably, a rotary screw 22, such as an auger, most preferably a pin auger having a shaft with agitator pins 17 arranged helically around the shaft to mix the shreds and permit countercurrent flow of gas and/or oil vapor through the pyrolysis reactor. Such a device is preferably used to distribute and convey tire shreds through the reactor 26 as shown in FIGS. 7 and 7a. The reactor is preferably formed of corrosion-resistant stainless steel or other corrosion-resistant metal, preferably RA 85H with a wall thickness of about 1.25 cm. The rate of travel through the reactor can be varied to provide an ideal residence time for the tire shreds within the reactor in order to produce high quality carbon black with minimal carbon volatiles, i.e., with volatiles, i.e., residual hydrocarbon in the carbon black, of less than about 4% when using a volatiles test of 7 minutes in a capped container at about 950° C. Further the feed rate and timing of entry into the pyrolysis reactor may be controlled by at least one, and preferably several timed feed airlocks. Preferably three such airlocks 31 as shown in FIG. 7 at the shreds feed inlet 30 into the pyrolysis reactor 26. Such airlocks are preferably timed such that they are always fully opened or fully closed and respond to any suitable control system in response to a signal for the airlock(s) to move simultaneously from side-to-side in the case of flapper type airlocks. A limit switch may be provided as a safety feature to prevent the airlocks from opening without the appropriate signal. Such features and control systems may be any suitable airlock controlling system capable of such timed opening and closing which may be known in the art or to be developed. The feed airlocks 31 into the pyrolysis reactor may also be timed by various timing devices working with and/or responding to the control mechanism, including mechanical drives or solenoid driven mechanisms. The purpose of the timed airlocks, if used, is to keep the reactor from building pressure and to assist in control of the feed into the pyrolysis reactor. Such timing can also be used effectively to minimize pressure fluctuation in the system and to allow the passage of "bird's nests" of agglomerated fiberglass easily through the system.

The faster the auger is rotated, the faster the tire shreds may be fed to the process. The residence time in the reactor is preferably controlled by varying the speed of the auger, for example, by using a variable speed drive or similar mechanism. Further, in addition to varying the residence time or to varying the feed rate, the temperature may also be varied to provide an ideal pyrolysis reaction. The pyrolysis reaction within the reactor 26 breaks complex molecules in the tire shreds down into simpler molecules using indirect heat from at least one heating element 28. Such a process is also known as destructive distillation.

In the preferred embodiment, the rate at which the shreds are fed through the reactor 26 on a pin auger is from about 300 kg/hr to about 1100 kg/hr, and more preferably from about 900 kg/hr to about 1000 kg/hr. It is also preferred that the reactor is primarily or completely stainless steel, however, other similar and preferably corrosion- and temperature-resistant metals may be used to form the reactor. The reactor 26 is in heat exchange relation with at least one heating element 28, which may provide heat by using sources such as hydrocarbon or natural fuel (gas, coal, wood), electric heat, hot flue gas from a high-temperature incinerator or other heating sources. Most preferably, the reactor 26 is jacketed, for example, by a surrounding structure or jacket 35 and the jacketed portion is heated with gases produced by burning fuel in a firebox or similar furnace. In using a firebox, the reactor 26 would preferably be mounted within a refractory-lined furnace box (firebox), arranged in the manner of representative jacket 35, which would preferably be in heat exchange relation with or include one or more gas burners. In a most preferred embodiment, the gas used to provide heat in the burner(s) is taken from gas that remains uncondensed after passing through an outlet from a separator or a condenser in the separation section, as described further below, which is in fluid communication with at least one gas inlet 27 into the burner(s). In burning fuel for the firebox or other similar heating element 28, hot stack gases from the burning process are directed outwardly from the firebox as effluent flue gas through a stack or other outlet 29 as shown in FIG. 2.

While the above-described pyrolysis reactor which is continuous and has the pin auger as specified is preferred, it will be understood, based on this disclosure that any suitable, preferably continuous, pyrolysis reactor capable of heating the tire shreds fed into the reactor to a temperature sufficient to pyrolyze the tire shreds is within the scope of the invention.

The pyrolytic reaction within the reactor 26 occurs at temperatures above 400° C., preferably from about 450° C. to about 500° C. This temperature may be achieved, for example, by using a firebox having gas burners with a firebox temperature of from about 880° C. to about 1000° C., and more preferably from about 950° C. to about 980° C. and a flue gas temperature of from about 700° C. to about 780° C., and more preferably from about 750° C. to about 770° C. Carbon leaving the pyrolysis reactor preferably achieves a discharge temperature of from about 200° C. to about 315° C., and more preferably from about 230° C. to about 260° C.

The operating pressure within the reactor 26 is below atmospheric pressure and preferably from about −30 Pa to about −190 Pa, more preferably from about −60 to about −125 Pa to provide a slight vacuum pressure within the reactor. Tire shreds fed into the reactor 26 are preferably fed through a tire shreds inlet 30 to the reactor. The inlet must be air tight such that the reactor 26 is substantially, and preferably completely, anaerobic in operation. In order to provide an air tight tire shreds inlet 30, airlock arrays having staggered cycles such as airlocks 31 in FIG. 7 and as discussed above should be provided to the inlet and preferably to any outlets of the reactor 26. The airlocks may be any suitable airlocks commercially available or to be developed. Most preferably flapper air locks, such as those schematically shown as 25 in FIGS. 3 and 4 for use between the solids outlet of the pyrolysis reactor and the solids inlet of the cooling auger 36 and at the outlet of cooling auger 36, are used for the reactor inlets and outlets. Preferably three flapper air locks are provided on the inlet and two flapper airlocks on the outlet such that continuous feed can be maintained without exposure of the tire shreds through inlets and outlets to oxygen.

In addition to air locks, the inlets and outlets of the reactor 26 should include fittings or seals which take into account any difference in the coefficient of thermal expansion of the reactor walls and any different materials which may be used for formation of the continuous feed mechanism within the reactor (such as the auger screw or the like). Preferably, the fittings are adjustable or slidable to take account of any thermal expansion of a screw or other rotary feed mechanism. For example, as shown in FIG. 7, the reactor auger shaft 22 is preferably mounted on bearings which allow for thermal expansion and contraction of the shaft. This may be achieved by using a spherical carbon bearing mount 43 with adjustable bolts and plates to support the discharge end of the reactor shaft. Further, the reactor shaft within the reactor tube may be adjustably suspended within the firebox at the solids removal outlet of the pyrolysis reactor by providing an external flexible assembly 47 which is capable of compensating for thermal expansion of the reactor during pyrolysis. The flexible assembly 47 preferably includes a trolley 51 adjustably suspended by a support structure, such as an I-beam 55 the trolley 51 may be connected by a horizontal trolley cable 61 to the area of the solids removal outlet of the pyrolysis reactor 26 which may be a tension adjustable movable cable or cables. Such cables may be suspended on either side and/or around an end cap or other outer portion of the outlet end of the pyrolysis reactor. They may be made adjustable in any suitable manner, including use of a device such as a turnbuckle 63 or other similar tension adjusting apparatus. Such a configuration may be used to relieve stress placed on mounting plates for the reactor tube and accommodate changes due to thermal expansion.

Tire shreds within the reactor 26 are pyrolyzed resulting in formation of pyrolysis gases and solids. The solids include carbon, as well as steel and fiber from the tire shreds. The pyrolysis gases are primarily hydrocarbons; however, the gases also include particulate and oil vapor within the gaseous stream leaving the reactor. The solid materials pass through the solids removal outlet 32, which is preferably located at the end of the screw or other continuous mechanism and/or at the bottom of a batch or gravity fed system.

Figure 5:
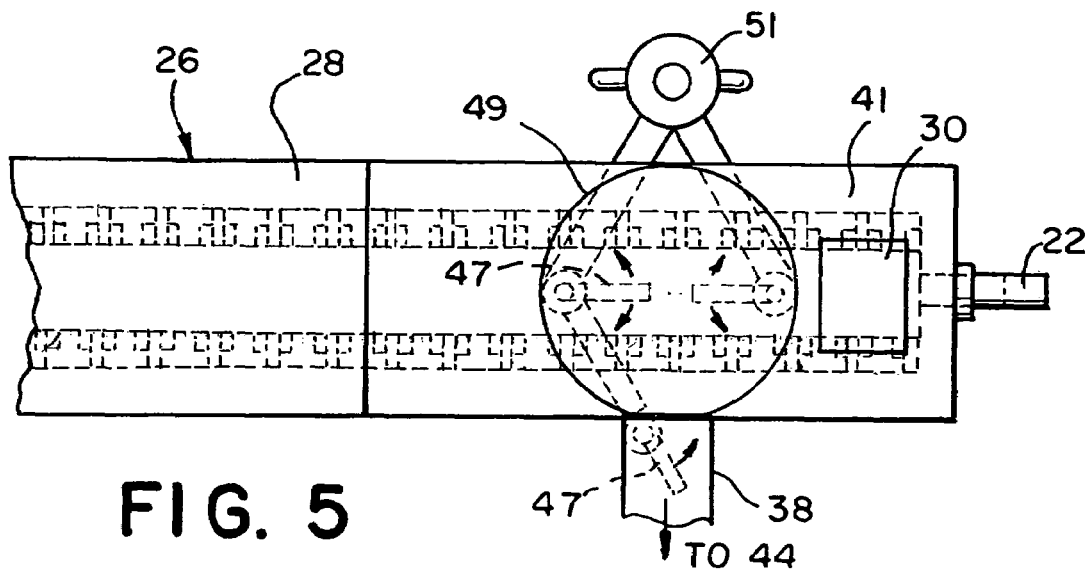
FIG. 5 is top elevational view of an expansion tank on one end of a reactor in accordance with an embodiment of the pyrolysis system of the invention as shown in FIG. 7.
Figure 5A:
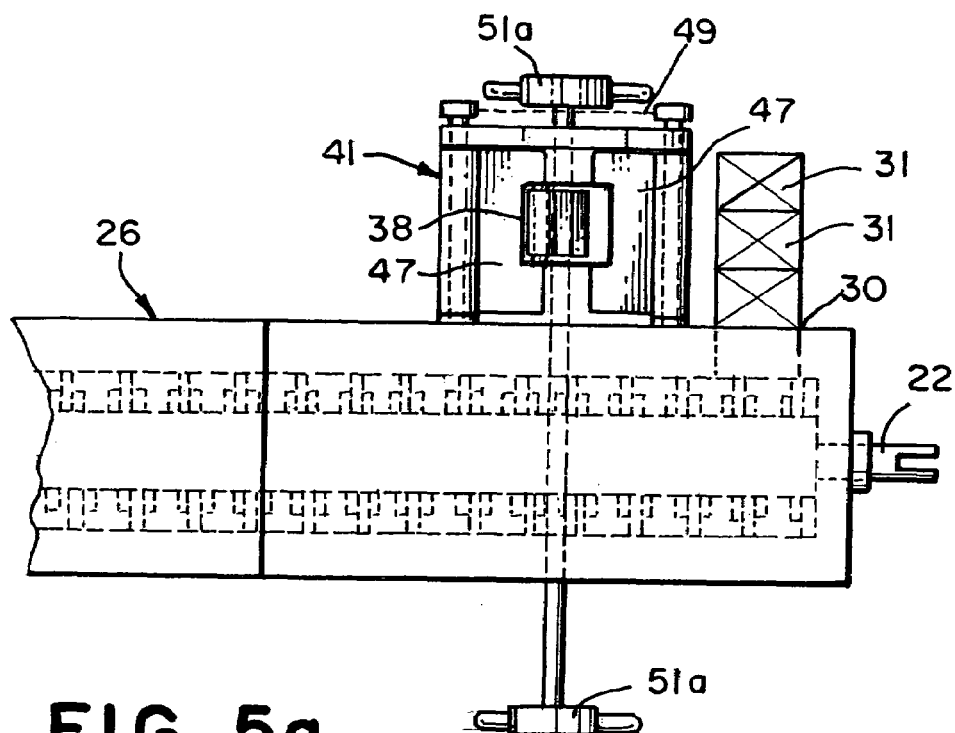
FIG. 5a is a back elevational cross sectional view of the expansion tank in FIG. 7.

More preferably, one end of the reactor tube and screw include an expansion tank 41 as shown in FIGS. 5, 5a and 7. The expansion tank 41 allows hydrocarbon containing gases to pass and expand upwardly through a vertically extending portion of the expansion tank which includes a series of paddles 47 for periodic manual clean-out of the gas outlet area. The bottom of the vertically extending portion is in open communication with the hydrocarbon gas outlet 38 of the reactor and allows solid materials entrained in the gas stream to fall back into the reactor. The paddles 47 may be used not only to clean out the upper portion of the expansion tank 41 near the gas outlet 38, but may also be located in the gas outlet conduit itself for further clean-out of solid deposits. Such deposits then fall be gravity into the solids area of the expansion tank and are transported by the screw to the solids outlet 32. The paddles 47 are preferably manually actuated by a T-bar; however other similar manual actuators may be used. The T-bar 51a as shown in FIGS. 5, 5a and 7 may be turned to operate a chain drive 49 or belts or other similar device to move the paddles 47 in either direction within the vertical portion of the expansion tank 41 as shown by the arrows in FIG. 5.

Figure 6:
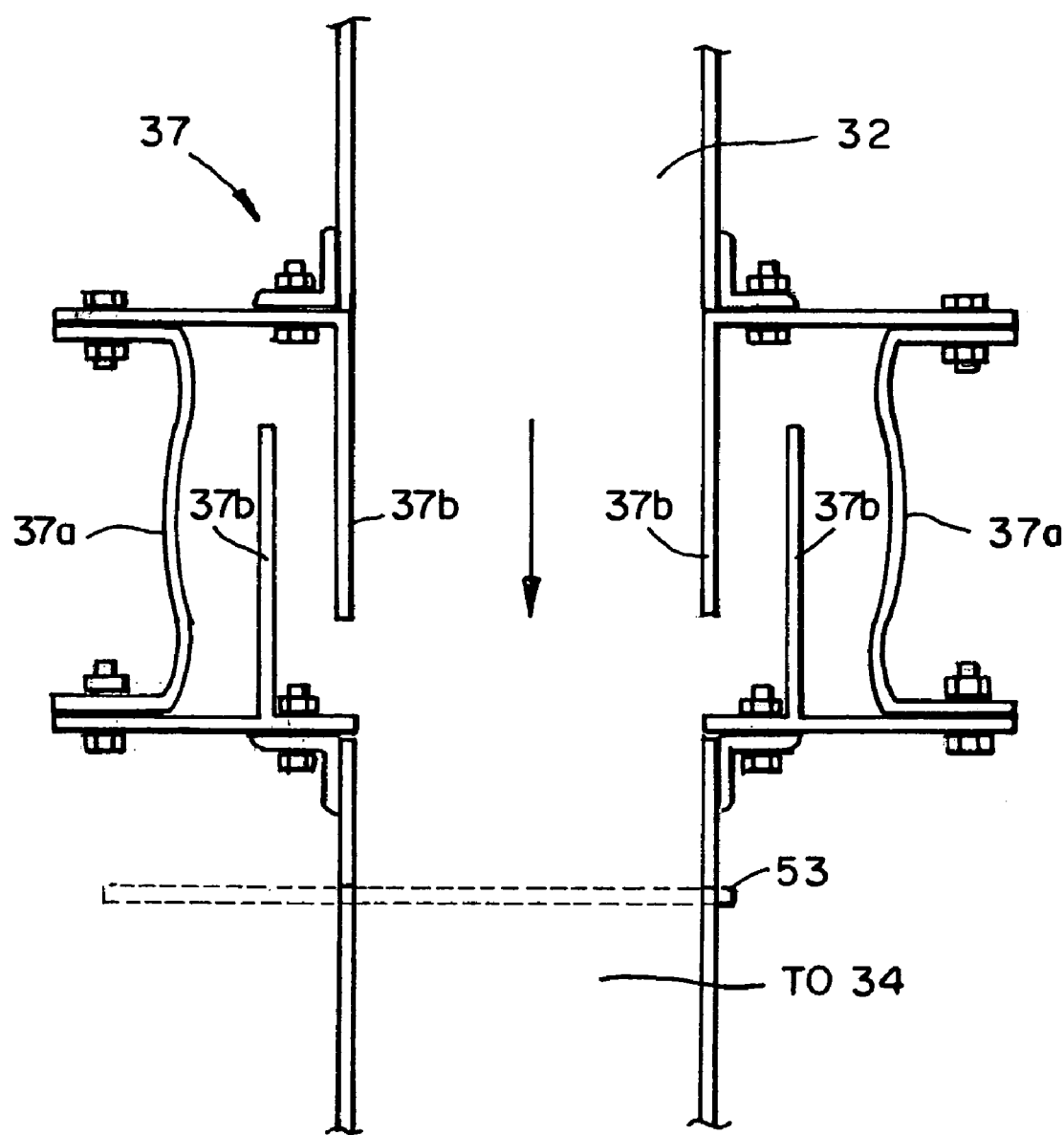
FIG. 6 is a cross section of a flexible compensator for use in an embodiment of the pyrolysis system of the invention.

Preferably the solids removal outlet 32 is located at the bottom of the reactor 26, and preferably below any expansion tank such as expansion tank 41, and preferably at the end of a pin auger as described above. The solids removal outlet 32, which preferably also is in communication with two or more airlocks, is in further communication with the inlet 34 of the cooling auger 36 through an airtight flexible compensator 37 as shown in detail in FIG. 6 which allows the communication to be maintained through various position changes caused by thermal expansion and contraction of the reactor. The solids leaving the pyrolysis reactor through outlet 32 may be transported to the inlet 34 of the auger 36 by gravity. A pneumatically controlled slide-gate mechanism 53 is preferably used which seals off the passage between the flexible compensator and the cooling auger if the oxygen content of the flue gas being injected in to the auger exceeds an acceptable set point. The configuration of the slide gate mechanism is not critical and any suitable shut off device may be used, provided that it is capable of completely closing the area between the flexible compensator and the reactor discharge if the in response to a signal indicating the oxygen set point has been exceeded.

While solids are preferably transported by gravity, solids may be transported through a conduit, conveyor, tray system, an additional auger, or by using any other suitable solids conveyance mechanism 33; however, such systems are not preferred for use in the present system. Preferably, the solids are transported by gravity, and a pneumatically controlled slide gate 53 mechanically seals off the passage between the flexible compensator 37 and the reactor discharge as noted above. The reactor solids handling auger, also referred to herein as the cooling auger 36 directs the solids for further separation in the carbon black separation system as described below.

The gas stream passes outward from the gas stream removal outlet 38 of the pyrolysis reactor 26 and is directed through conduit 40 to a gas stream inlet 42 of a separator 44, such that the gas stream removal outlet 38 is in fluid communication with the inlet 42 of the separator 44. The mechanical clean-out paddles 47 noted above are preferably located in a transition zone between the separator inlet 42 and the gas stream removal outlet 38 to prevent carbon deposit build-up. Preferably, a mechanical cleanout device is located in transition zone of conduit 40 to eliminate build-up of carbon deposits. The gas stream that passes into the gas stream inlet 42 of separator 44 is contacted with an oil spray from at least one oil sprayer 48. The number of sprayers may be varied and depend to a large extent on the size of the separator 44, in that the sprayers and the inlets to the sprayers are preferably located in the upper portion 45 of separator 44. As such, the number of sprayers is typically limited by the number which will fit across the separator 44 in the transverse direction. However, it will be understood that more than one row of oil sprayers 48 may be used, and that the spray heads may be staggered or arranged in various configurations, provided the oil spray from the spray heads sprays oil such that it contacts the hot gas stream entering the separator 44 from the reactor 26.

The temperature of the oil spray from the oil sprayers 48 should be cooler than the hot gas stream entering the separator 44, and should further be sufficiently cool so as to condense at least a portion of the oil in the gas stream. It is further preferred that the path the hot gas must travel from the pyrolysis reactor to the separator be minimized to avoid premature condensation and to maintain the hot temperature of the hydrocarbon-containing gas stream as it enters the separator. One method for doing this is to provide a minimal path length to the separator.

The temperature of the separator 44 is preferably sufficiently low to condense a substantial amount of oil from the gas stream. Preferably the temperature of the oil in the oil sprayer for use in the separator is adjusted to maintain the leaving gas stream at a temperature of from about 55° C. to about 65° C., more preferably from about 58° C. to about 62° C. The gas stream in the separator contacts oil sprayers providing oil at a temperature sufficient to condense heavier oils having a flashpoint higher than about 40° C. The preferred oil spray temperature is from about 50° C. to about 60° C., and more preferably from about 55° C. to about 60° C. at a flow rate of 10 gal/min.

The temperature of the oil in the oil sprayers is regulated in a preferred embodiment of the invention through use of a heat exchanger 52 fed with cooling water. For cooler temperatures in the heat exchanger 52, a chiller (not shown) may be used to further cool the temperature of a cooling water feed from a cooling water source 56. In the invention, a cooling water source may be used to feed various cooling needs in the system by pumping the cooling water from the cooling water source 56, such as quarry water, a cooling tower, a chiller, reservoir water or the like through a pumping system 58 to various needs throughout the process using conduits 57, 57a, 57c as shown in FIGS. 1 and 2. Warm water after use in a heat exchanger or condenser within the system may be returned to the cooling water source through various common return conduits 59, 59a, 59c as shown in FIGS. 1 and 2, and cooled in a cooling tower system, by refrigeration or other cooling methods. In addition, for graduated cooler temperature in successive separators, as an alternative to chilled cooling water, refrigerant or other cooling fluids such as Dowtherm® and the like as are well known in the art may be used. It will be understood by one of ordinary skill in the art, based on this disclosure, that while water and cooling fluids are described herein, cool gas or other cooling systems including those using heat sinks to depress temperature, may be adapted for use in cooling the gas stream to successively cooler temperatures in the separators 44, 46.

Oil cooled through the heat exchanger 52 is preferably oil which is recycled by diverting a portion of the condensed oil from the liquid outlet 64 of the separator 44 which passes through conduit 60 away from the separator for cooling in the heat exchanger 52. The cooled oil leaving the oil outlet of the heat exchanger is then fed respectively to the sprayers 48. Oil leaves the separator 44 through liquid outlet 64, preferably on the side of the separator 44 preferably after passing under a fixed, vertical partition 69 with the lower end of the partition below the surface of the oil pool at the bottom of the separator. Heavy sludge which collects at the bottom of the oil pool may then be removed separately through a sludge discharge pipe in the bottom of the separator or by any other suitable method. Before diverting a portion of the oil into the heat exchanger, the oil is preferably screened and pulverized to separate solid containing sludge within the oil in the sludge removal system 68. Such sludge separation may be performed in various ways, preferably, by screening the oil such that particulate laden sludge is removed on the screening mechanism and collected in a sludge drum 66 or other collection area. Since trapped hydrocarbon vapors are released in the screening process, these gases may be removed by connecting the space above the screen to the negatively pressurized hydrocarbon line connecting the separator to the condenser by use of a dedicated vent line 71 as shown in FIG. 2 running from both sludge removal system 68.

Screened oil may be collected as heavy oil product and passed to a storage tank or other heavy oil collection area. Sludge is preferably pulverized in the main portion of the sludge removal system 68, preferably a sludge chopping systeme and may be collected as waste by-product or, more preferably fed back to the pyrolysis reactor 26 by pumping or similar liquid conveyance system. The sludge removal system 68 is preferably formed to include a pulverizing unit beneath the screening section. The pulverizing unit is preferably commercial pulverizers or delumpers such as those manufactured by Franklin-Miller. Such delumpers adequately chop and pulverize the sludge for processing and/or re-use in the reactor. Pulverized or exit sludge is preferably carried back to the pyrolysis reactor 26 through conduit 72 and is fed into the pyrolysis reactor through an airtight sludge inlet. While, for convenience the inlet is shown in FIG. 2 at the bottom of the reactor 26, it is preferred that sludge be fed into an inlet near the beginning of the pyrolysis. Without wishing to be bound by theory, applicants believe that reuse of the sludge from the bottoms of the separator assists in enhancing the efficiency of the pyrolysis reaction within reactor 26.

The invention allows for the reuse of a portion of the oil from the separator by cooling and screening the oil and using it as an oil spray fed into at least one oil spray inlet 76 respectively into the at least one oil sprayer 48 of the separator 44. The oil spray inlets 76 are in fluid communication with the liquid outlet 64 of the separator 44, preferably through the heat exchanger 52 such that a portion of the oil condensed in the separator may be cooled and reused in the spray heads. This reuse of oil not only functions to provide condensation of heavy oils and tars from the gas stream leaving the reactor and entering the separator, but also functions to wash particulate from the gas stream to provide less particulate in gas streams leaving each of the separators.

The non-condensed gas from the separator 44 is then directed away from the separator through a non-condensed gas outlet 80 in fluid communication with the inlet 86 of a condenser 88. The condenser contains an array of vertical water-cooled pipes with cooling water at a temperature sufficient to further condense any remaining oil within the non-condensed gas stream passing into the condenser 88 through inlet 86. The remaining oil passes through a liquid outlet 89 and is collected in an oil collection area 90, such as a storage tank. The oil is then pumped back through pump 78 back to separator 44 to thin the oil and prevent thickening and clogging. Non-condensed gases leaving the condenser are volatile gases such as methane, hydrogen and propane which may be further fractionated by any gas fractionation method known to those of ordinary skill in the art or to be developed, and/or passed through a gas collection system. The gas collection system may collect a portion of the gas for further use in the process, preferably for use as fuel for generating heat for the heating element 28 in the pyrolysis reactor 26. The gas is preferably drawn through the separator 44 and the condenser 88 by using a pressure adjusting source such as a vacuum system or, more preferably by using a blower or a similar device such as blower 92. Non-condensed gas leaving the non-condensed gas outlet 95 of the condenser 88 passes through blower 92.

Remaining gas may then be directed through a conduit such as conduit 96 for use in the pyrolysis heating element(s) 28 as shown in FIG. 1, and may also be collected for resale through conduit 98 to a storage tank; directed to a boiler for providing thermal energy such as hot water or steam; directed to an electric generator to provide electricity; or directed through a conduit 100 for burning off using a flare (not shown). The pressure adjusting source such as blower 92 has an inlet side 92a in communication with the gas outlet 95 of the condenser 88. It is preferred that the pressure adjusting source, such as blower 92 is capable of maintaining constant reactor pressure in the pyrolysis reactor by regulating gas flow from the pyrolysis reactor, through the separator and condenser. The outlet side 92b of the blower is in communication with a gas flow control valve, which may be any suitable gas control valve known in the art or to be developed, but is preferably an automatic butterfly valve such as valve 94. Such valve or similar gas flow control by being placed on the outlet or positive pressure side of the blower avoids intermittence caused by fluctuation into the blower and allows for smooth and substantially constant pressure in the pyrolysis reactor.

The reuse of the gases for fuel for heating the pyrolysis reaction is preferred as it provides significant process economy allowing the process to be energy independent of outside fuel sources after the pyrolysis process has been started. However, it will be understood, based on this disclosure that none of the non-condensed gas need be used, saved or resold and may simply be burned off as waste. It is further preferred that the oil separation system within the tire pyrolysis system 10 includes at least one pressure relief valve 87 before the system of the separator and condenser described herein and as shown in FIG. 1 to avoid pressure building within this equipment and to minimize blockages.

In addition to the novel separator and condenser oil and gas separation system described above, the tire pyrolysis system according to the invention includes a solids separation system including a cooling auger 36 for cooling the solids from the pyrolysis reactor and a carbon black separation system 102.

The tire pyrolysis system of the invention produces high quality carbon black by preventing contamination of the solids removed from the pyrolysis reactor 26 from exposure to air and from entrained pyrolysis gases from the pyrolysis reactor. This prevention of contamination is enhanced both by use of airlocks at the inlets and outlets of the pyrolysis reactor, and preferably at the solids inlet 34 and solids outlet 104 of the auger 36, but also by creating a pressure within the auger 36 which is greater than the pressure within the pyrolysis reactor 26 and which is greater than the pressure in the carbon black separation system 102. Most preferably, the pressure within the reactor 26 is also less than the pressure in the carbon black separation system 102. As a result of the pressure balance within the tire pyrolysis system 10, gases are directed by using the blower 92 or other similar gas drawing pressure adjusting source from the reactor 26 into the gas and oil separation system as shown in FIG. 2. Solids leaving the pyrolysis reactor are substantially stripped of such gases. Further, before the solids conveyed from the pyrolysis reactor 26 solids outlet 32 can enter the inlet 34 of the auger 36, they are subjected to a positive pressure from within the auger 36 which suppresses entry of unwanted gases which may contaminate the solids. In this aspect of the invention, the use of airlocks is highly beneficial, particularly when such airlocks are timed to prevent pressure surges and clogging.

The auger 36 is preferably pressurized with an inert gas in order to prevent combustion of the hot carbon. The inert gas may be provided by an inert gas source such as a nitrogen feed. However, it is most preferred, in accordance with the invention that cooled flue gas generated by burners burning purified pyrolysis gas be injected into the auger 36. This embodiment is preferred since it provides a use for the flue gases, and because contamination is greatly reduced. Since the gas used for fuel within the burners is produced within the system of the invention, the gas is substantially oxygen free, and, after burning, produces an effluent flue gas which has very low levels of oxygen. Further, the gas has preferably been separated from particulates to a substantial degree in the hydrocarbon separator. The effluent gas from burning in the heating element 28, once cooled, when injected into the cooling auger provides substantially clean and low oxygen inert gas that not only pressurizes the cooling auger, but also prevents combustion of the hot carbon. The cooling auger is also provided with pressure relief valves which open if air leaks into the auger cavity and causes the carbon to oxidize.

Figure 3:
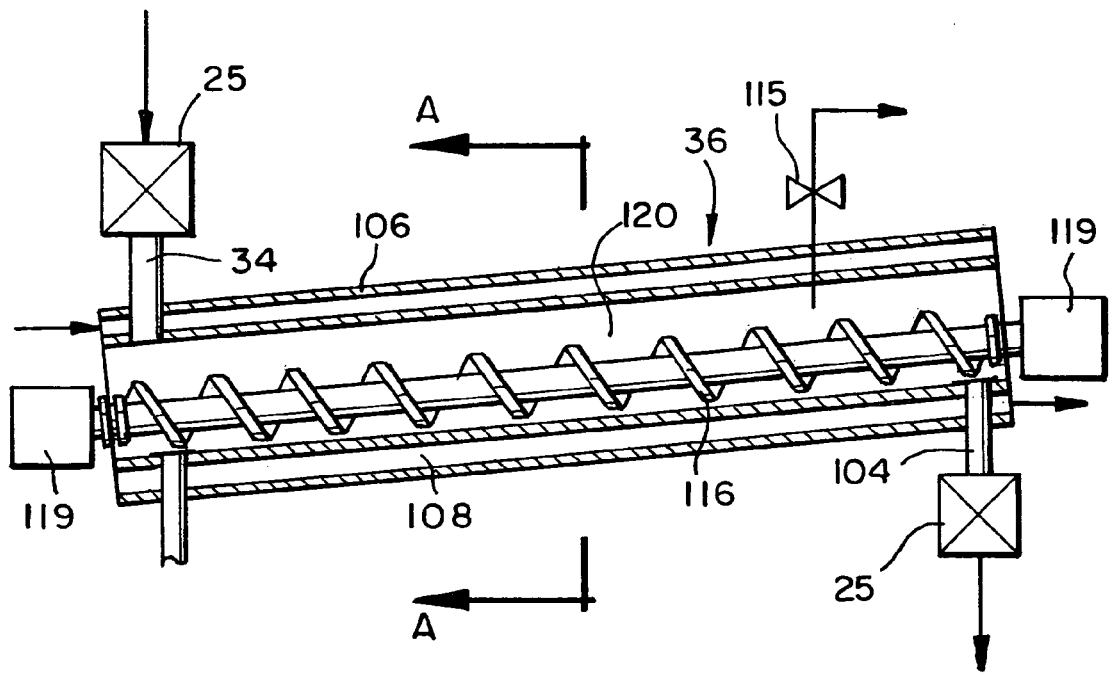
FIG. 3 is a longitudinal cross sectional representation of the reactor solids handling auger used in the process of FIG. 1.
Figure 4:
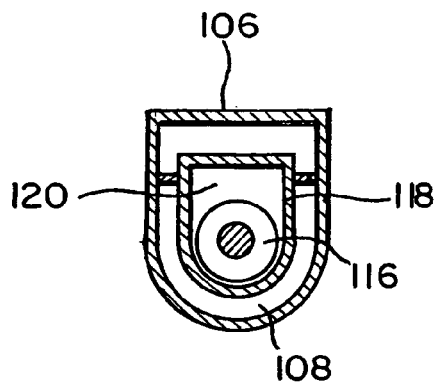
FIG. 4 is a cross sectional representation of the reactor solids handling auger of FIG. 3 taken along line A-A.

The hot solids in the auger are preferably cooled by cooling water introduced to a cooling jacket such as jacket 106 surrounding a cooling fluid space 108 as shown in FIGS. 3 and 4. The oxygen content of the injected flue gas is preferably continuously monitored, such that if the oxygen level of the flue gas rises above an adjustable set-point, the control system automatically shuts the pneumatic slide gate 53 in the passage connecting the reactor solid discharge to the cooling auger, thereby isolating the reactor from the high oxygen levels in the flue gas. The cooling auger 36, includes air locks 25 at the solids inlet 34 and solids outlet 104. Preferably, timed flapper air locks are used; however, any suitable air lock may be used as described above with respect to the reactor 26.

At least a portion of the non-condensed gas including hydrocarbons from the gas stream resulting from the oil separation system, taken either directly from the separator or from the condenser, preferably after separation, after being directed to the separator and separated from oil is preferably directed to the heating element(s) 28. The heating element(s) in this preferred embodiment of the invention preferably include at least one burner in a firebox or other furnace. Preferably, the firebox having the heating elements 28 surrounds the reactor tube surrounding the pin auger screw. At least a portion of effluent gas leaving an effluent gas outlet 111 of the firebox or other heating element 28 preferably passes through a stack 29 and is extracted and directed to a heat exchanger 110. The heat exchanger has an effluent gas inlet 112 and a cooled effluent gas outlet 114. The cooled effluent gas outlet is in fluid communication with the cooling auger 36 as shown in FIG. 1, such that the cooled effluent gas may be injected into the cooling auger 36. The effluent gas may be injected using any of a variety of gas injection techniques, preferably, a blower or other venturi type gas injection system is used, and most preferably a blower.

The temperature of the cooling inert gas injected into the auger is preferably from about 15° C. to about 21° C., more preferably from about 16° C. to about 17° C. The gas is injected such that the pressure within the auger is greater than atmospheric, and preferably from about 30 Pa to about 190 Pa, more preferably from about 60 Pa to about 125 Pa. The positive pressure at the inlet 34 and outlet 104 of the auger 36 prevents oxygen and contaminants from entering the cooling auger 36 and provides for a higher quality carbon black product after separation. A pressure relief valve 115 is preferably provided to the auger 36 to avoid overpressurizing the auger 36.

The cooling auger 36 is preferably a trough auger having a screw mechanism 116 which fits tightly within the trough 118 along the sides and bottom of the screw mechanism with little or no clearance for conveyed solids, and which includes turning mechanisms 119 which may include devices such as gear boxes and drive motors as are well known in the art. However, the top of the U-shaped trough allows clearance over the screw to avoid blockage of solids due to clumping of steel, fiber or other materials within the carbon solids, otherwise known as "birds' nests" which could cause the screw auger to shut down. Such process shut downs caused by solids handling in prior art pyrolysis systems having circular augers which results in significant process down time, since the process and the solids handling system would have to be shut down, the reactor cooled down, the auger cleaned out and oxygen removed, and the reactor started again and gradually brought up to its process temperature. Such down time can be as long as one or two process days. By using the U-shaped trough auger, the screw moves the material forward through the cooling auger 36, but birds' nests are broken free when passing through the space 120 above the screw 116. While not necessary, in one embodiment, numerous small projections (not shown) such as disks or pricks which extend and are attached at right angles to the flat surface of the auger's flighting are preferably provided to enhance tumbling action and, consequently, enhance heat exchange as the solid material is cooled by the water jacket.

Carbon black and other solids, such as steel and fiber leave the cooling auger through outlet 104 are directed into a carbon black separation system 102 through an inlet 103. The inlet 103 preferably leads initially to a screening mechanism as discussed below, however, other mechanisms, such as size metering devices or the like may be used without departing from the spirit of the invention. The solids are preferably conveyed between equipment in the carbon black handling system using trough augers having a similar screw and trough design to auger 36, however, no inert gas orjacketing is needed in these augers. It should be understood, however, that augers having a U-shaped trough are preferred but optional and that other solids handling equipment may be used in place of augers between solids separation equipment. In addition use of the projections, such as disks and the like noted above extending from the flighting in the augers to help agglomerate and remove remaining fiberglass are preferred in the trough augers in the carbon black separation section 102 as well.

Solids leaving the cooling auger 36 are transported from the cooling auger 36 by an air tight solids conveyance mechanism, preferably, a further, air tight screw auger, preferably having disk or other projections as noted above, to an inlet of at least one carbon black separator such as a Grizzley ERIEZ Mechanical Separator, which may be customized for particular systems, or other vibratory separator (s) 122. While only one such carbon black separator is necessary, others may be provided in series for additional separation. In a preferred embodiment of the invention, the outlet 104 of the auger is in communication with the inlet of the vibratory separator 122 which also serves as the inlet 103 of the carbon black separation system. The carbon black screen separator 122 functions to separate solids of greater than 5 mesh, and more preferably greater than 4 mesh from the remaining smaller particulates. Primarily, steel 20a, agglomerated steel ("birds' nests") and fiber 125, or "fluff" from aggregated fiber, are removed using the vibratory separator 122. Further separation of the steel and fiber may be effected, but is not required in the invention. Carbon-containing solids passing through the solids outlet 123 of the vibratory separator drop through a channel by gravity to a magnetic separator 124. Any suitable magnetic separator 124 may be used. The magnetic separator 124 further removes remaining metallic particulates 20b, such as steel, which can be taken, along with metals such as steel removed from other portions of the system and recovered for commercial use as scrap, wire, or for any other application which can utilize recovered steel.

It will be understood, based on this disclosure, that the magnetic separation of steel may be done in a different order within the carbon black separation system, or may be part of the vibratory separator 122. However, once the larger pieces have been removed using the vibratory separator 122, the carbon black leaving the solids outlet 123 is in communication with a grinding apparatus 126 through a magnetic separator such as magnetic separator 124. Remaining carbon-containing solids preferably pass through a further air tight conveyance mechanism, preferably a further air tight trough auger from the vibratory screen separator and, in preferred embodiments from the magnetic separator, to a grinding apparatus 126 capable of grinding the carbon-containing solids to a relatively uniform particle size ranging from about 18 mesh to about 22 mesh, more preferably from about 19 mesh to about 20 mesh.

Preferably, the grinding apparatus 126 is a roller mill, such as a Roskamp Champion. Ground carbon leaving the roller mill is transported in a further, and preferably air tight, conveyance such as a screw auger with numerous small projections, such as disks or pricks affixed at right angles to the flat surface of the auger's flighting to enhance tumbling action with consequent agglomeration of small fiberglass particles into larger pieces to a screener 128 having one or more vibratory screens in order to remove more coarse particles having a mesh of about 18 mesh or greater, and for allowing smaller particles to proceed to bagging, preferably in 35 ft³ bags which may be reused several times before requiring replacement. The larger particles may be conveyed back by separate line 130 to the grinding apparatus 126 for further processing as shown in FIG. 1.

The carbon black particles leaving the screener having mesh less than about 18 mesh are then processed for re-sale. Preferably, the carbon black particles are bagged at a bagging station 132. While, at this stage, minimal air exposure is acceptable, it is preferred that the system still be largely oxygen free. Both the screener and bagging system are in solids communication with the grinding apparatus 126. The carbon black particles are preferably dropped by gravity into super sacks which are removed when full and weighed.

The above tire pyrolysis system, may be adapted to provide the unique features of the system in various combinations as described herein, such that a tire pyrolysis system may be provided having both a cooling screw auger as described herein and an oil sprayer recycling system within an oil separation system, or either of these features alone without the other. Further, the positive pressurization of the auger using inert gas and/or the use of cooled flue gas as an inert gas may be adapted in other tire pyrolysis systems. It is preferred however, in one embodiment of the invention, that the tire pyrolysis system 10 according to the invention includes a pyrolysis reactor 26, as described above, at least one heating element such as heating element 28 in heat exchange relation with the pyrolysis reactor, a separator, such as separator 44 with at least one oil sprayer having a sprayer inlet in the upper portion of the separator, and an auger with an inlet and an outlet. Other features, such as those described above may further be provided to this embodiment.

In an alternative embodiment, the tire pyrolysis system 10, includes a pyrolysis reactor 26, at least one burner in heat exchange relation with the pyrolysis reactor, a separator such as separator 44 which has a non-condensed gas outlet in communication with the gas inlet of the at least one burner, and an auger such as auger 36 which has an inlet 34 in communication with the solids removal outlet 32 of the pyrolysis reactor 26, and a heat exchanger such as heat exchanger 110 which cools effluent gas from the outlet of the at least one burner and which has an outlet in fluid communication with the auger such that cooled effluent gas can be injected into the auger as described above. This embodiment may also include any of the additional features, such as the oil sprayers and oil recirculation system as described above and use of a trough auger as described above.

The invention further includes a process for pyrolyzing tire shreds. Tires, preferably in the form of shreds, as described above, are fed into a pyrolysis reactor. The shreds may be formed at the same location as the pyrolysis reactor using shredders and feeding mechanisms such as those described above with respect to tire pyrolysis system 10, or may be produced at another location, and transported and fed directly to the reactor. While any pyrolysis reactor may be used, a continuous pyrolysis reactor, as described above with respect to pyrolysis reactor 26 is preferred. Solids including carbon are removed from the pyrolysis reactor after sufficient residence time at the requisite heat and pressure, as described above, for pyrolysis of the tires into a hydrocarbon-containing gas stream and solids containing carbon. The gas stream is directed to a separator, preferably, such as separator 44 described above. The gas stream is contacted in the separator with an oil spray to thereby wash particulate from the gas stream and to condense a portion of the gas stream to oil. The separator 44 is preferably used in conjunction with a downstream condenser such as condenser 88 to avoid fouling of downstream equipment from process gas, than typically heavier oils will be removed from the separator, with lighter oil and gas being removed from the condenser. In such case, a cooling temperature in the separator should be used which is capable of condensing heavier oils.

Oils from the separator and/or condenser are removed from the separator and/or condenser and may be collected as products of the pyrolysis process. Preferably, a portion of the oil in the separator is cooled and directed to an inlet, such as oil spray inlets 76 for use as oil spray in the separator. The non-condensed gas from the separator is directed away from the separator. The non-condensed stream from the first separator may be collected for use as fuel or gas waste product directed to a flare, or directed to a water cooled condenser for collection of remaining oils in the gaseous stream having hydrocarbons. Gases which are not condensed in the final condenser or separator, depending on the process, may be directed to a flare, collected for use as gaseous end product, and at least a portion of such gases fed into an inlet of a heating element 24 such as one or more burners for use in pyrolyzing additional tire shreds. At least a portion of the effluent flue gas from such burners is then preferably extracted and cooled for use as a pressurizing inert gas for a cooling auger such as auger 36 above or any other appropriate use of a pressurized inert gas such as pressurization of oil wells to enhance yield.

The process further includes removing solids from the pyrolysis reactor and directed them to an auger having an inlet and an outlet such as auger 36 above. It is preferred that the pressure within the auger be greater than the pressure within the pyrolysis reactor, and more preferred that the pressure in the auger be maintained at greater than atmospheric pressure. Preferred pressure ranges within the auger are described above. The pressure may be maintained in the preferred range either by injecting an inert gas such as a nitrogen feed or by injecting cooled effluent gases from the heating element 28 as described above. Such inert gases are preferred in order to maintain the auger substantially anaerobic. As used herein, substantially anaerobic is intended to mean that oxygen is present in an amount of no greater than about 8%, and preferably no greater than about 6% in the auger, pyrolysis reactor or carbon black separation system.

In the process, carbon-containing solids are directed from the auger outlet to a carbon black separation system to separate the carbon black from the carbon-containing solids leaving the cooling auger. Preferably, the carbon black separation system includes components and features as described above with respect to carbon black separation system 102. However, it will be understood that the carbon black separation system may be modified. It is most preferred that even if the carbon black separation system is modified from that described above, that the pressure within the carbon black separation system be maintained at a pressure lower than the pressure in the cooling auger and higher than the pressure in the pyrolysis reactor. Most preferably, the pressure is the auger is maintained at greater than atmospheric pressure, such as the pressure ranges noted above with respect to the pyrolysis system 10, and that pyrolysis reactor is maintained at less than atmospheric pressure such as at the pressure ranges noted above for the reactor. Accordingly, it is preferred that the pressure in the carbon black handling system range from about −60 Pa to about 0 Pa and that the pressure stay at a level greater than the reactor pressure and lower than the auger pressure.

In a further embodiment of a process for pyrolyzing tire shreds according to the invention, the process includes feeding tire shreds to a pyrolysis reactor. The tire shreds may be formed using the tire shredding and feeding mechanisms described above with respect to the tire pyrolysis system 10. However, tire shreds may be produced elsewhere and fed directly to a pyrolysis reactor. The tire shreds are then pyrolyzed within the reactor, preferably a continuous reactor such as reactor 26 described above to produce a hydrocarbon-containing gas stream and a carbon-containing solid. The carbon-containing solid is removed from the pyrolysis reactor, and preferably directed to an auger. The hydrocarbon-containing gas stream is directed away from the pyrolysis reactor to a separator to condense at least a portion of the gas stream. Accordingly, the separator produces condensed oils and a non-condensed hydrocarbon-containing gas stream which leaves the separator. Preferably, the separator is a separator such as separator 44 described above, and more preferably includes at least one oil sprayer which is capable of receiving a portion of the condensed oil from the separator after passing through a heat exchanger such as heat exchanger 52 described above to cool the oil prior to spraying the hydrocarbon-containing gases passing through the separator 44. Further, it is preferred that a condenser, such as condenser 88 be provided to prevent system fouling as noted above.

The auger used in this embodiment of the method is preferably a trough auger as described above with respect to cooling auger 36 and has a pressure greater than the pressure in the pyrolysis reactor. At least a portion of the non-condensed gas from the gas stream leaving the separator is directed to at least one burner in heat exchange relation with the pyrolysis reactor to provide a source of fuel. Most preferably, after leaving the separator, the non-condensed gas stream is first passed through a further water cooled condenser, such as condenser 88 and the remaining non-condensed gas from the gas stream is directed to at least one burner. The burners may be the same as the burners noted above for use as heating element(s) 28 in the tire pyrolysis system 10. The non-condensed gas is burned in the burner(s) to heat the pyrolysis reactor and thereby generate an effluent flue gas. A portion of the effluent flue gas is extracted from the outlet or stack of the furnace or firebox containing the burners and cooled, preferably by a water-cooled heat exchanger such as heat exchanger 110 described above. The extracted portion of the effluent flue gas after being cooled is then injected into the auger as an inert cooling gas in the manner described above with respect to tire pyrolysis system 10. Preferably, by using such a cooled effluent gas as a pressurizing gas within the auger, positive pressure at the inlet and outlet of the auger may be effected to prevent oxygen from entering and to keep the auger substantially anaerobic.

Solids leaving the auger through a solids outlet such as outlet 104 are preferably directed to a carbon black separation system for separating carbon black from carbon-containing solids leaving the auger. Preferably, the carbon black separation system is as described above with respect to the carbon black separation system 102 in the tire pyrolysis system 10, however, other carbon black separation systems used in the art or to be developed may be used, provided that it is preferred that oxygen exposure be minimized to avoid contamination of the carbon black. It is further preferred, in all embodiments of the invention, that to avoid oxygen entering the process at various stages that one or more timed airlocks, such as flapper airlocks be provided at inlets and outlets of the pyrolysis reactor 26, the cooling auger 36.

In addition, by providing a positive pressure at the inlets and outlets of the auger, and by preferably maintaining the pressure in the pyrolysis reactor lower than the pressure in the auger, and the pressure in the carbon black separation system lower than the auger but higher than the pressure in the pyrolysis reactor, gas is directed away from the reactor using a blower or other similar gas drawing apparatus to the oil separation system, and solids are directed through the process with minimal exposure to fumes from the hydrocarbon-containing pyrolysis gases leaving the pyrolysis reactor and minimal exposure to oxygen. Further, by only using gases after burning in at least one burner in heat exchange relation with the pyrolysis reactor to pressurize the auger, the gases are sufficiently contaminant- and oxygen-free by the time they are used to pressurize the auger and high quality carbon black can be separated and refined from the process. The process is capable of yielding at least about 65 gallons/hr of light crude oil as well as at least about 450 lb of carbon black/hr (roughly 3.25 gallons of light crude oil/100 lbs of tires) and at least about 12 million BTU of gas/hr, and roughly 9 million BTU of gas/hr after the parasitic load of gas is subtracted to maintain the pyrolysis reactor.

The invention will now be described with respect to the following non-limiting examples:

EXAMPLE 1

Tire shreds of a maximum largest dimension of about 2 inches were fed at a rate of about 450 kg/hr to an inlet of a pin auger pyrolysis reactor heated using a firebox temperature of 980° C. The gas used in the firebox is pyrolytic gas taken from the outlet of a final condenser after passing through an oil separator and a final water-cooled condenser and then being further refined using a cyclone separator to remove particulates from the pyrolytic gas. The oil separator included oil sprayers for removing particulate in the hydrocarbon containing gas stream. The elements of the gases within the pyrolytic gas are shown below in Table 1. The composition of the effluent gas is also shown in Table 1 after burning. The effluent gas was cooled and passed into a cooling auger as described below. "ND" in Table 1 indicates a non-detectable amount of less than 0.001% by volume.

TABLE 1

| Gases | Pyrolytic Gas (vol. %) | Effluent Gas (vol. %) |
|---|---|---|
| Nitrogen | 1.93 | 72.0+ |
| Oxygen | 0.45 | 9.0 |
| Carbon Dioxide | 6.0 | 5.5 |
| Carbon Monoxide | 6.1 | ND |
| Hydrogen | 15.5 | ND |
| Helium | 4.2 | 4.3 |
| Methane | 26.7 | ND |
| Ethane | 5.4 | ND |
| Ethylene | 16.1 | ND |
| Propane | 2.5 | ND |
| Propylene | 7.3 | ND |
| Butenes | 3.4 | ND |
| Pentenes | 1.93 | ND |
| Hexenes | 1.03 | ND |
| Benzene | 1.16 | ND |
| Toluene | 0.26 | ND |
| Total Hydrocarbons | 65.78 | 0.001 |
| Specific Gravity (at 15.5° C.) | 0.881 | 1.00 |
| BTU/ft$^3$ (15.5° C./14 psi) - Wet | 1,218 | 0.0000 |
| BTU/ft$^3$ (15.5° C./14 psi) - Dry | 1,196 | 0.0000 |

Solids from the pyrolysis reactor were conveyed and cooled in trough auger to a temperature of about 60° C. at the outlet of the auger using cooled effluent gas having a composition as in Table 1. The effluent gas was cooled in a water cooled, shell and tube heat exchanger. Carbon containing solids from the auger were introduced into a Grizzly vibratory separator to remove steel and fiber and pieces of greater than about 4 mesh. The remaining solids were conveyed by an airtight auger to a magnetic separator to remove remaining steel fragments and the remaining carbon solids were introduced into a Roskamp® roller mill. The roller mill ground the carbon solids to an average particle size of 18 mesh. The carbon solids from the roller mill were then screened on a vibrating screener to remove particles having a size of greater than about 18 mesh. The final carbon black product was bagged and analyzed. The carbon black produced was satisfactory for use as a reinforcement agent having reinforcing properties in elastomers, filled thermoplastic, and other plastics similar to those of N774 and N990 commercial carbon black. The resulting carbon black is also useful as a filler or colorant in rubber or plastic, as a colorant for inks, dyes, pigments and dispersions, for carbonization in iron and steel, in cover applications for metals other than aluminum, in fuels, and in road asphalt compositions among other uses.

The properties of the carbon black resulting from various evaluative tests taken for a large number of samples were averaged and are shown below in Table 2. The test results include the percentage of carbon, i.e., fixed or elemental carbon in the carbon black; the percentage of volatiles which measures the amount of combustible vapors present in the carbon black; the percentage of sulfur; the percentage of ash remaining after combustion of a sample; the iodine number which is a quality control measure indicative of particle surface area; the pH; and the percentage absorption of carbon tetrachloride for evaluating the level of activation of the carbon black. In addition, the composition of ash produced from the combustion of a sample of carbon black producing 9% by weight ash is shown below in Table 3. Table 4 below also provides an approximate particle size distribution from a sample of the carbon black.

TABLE 2

| Test | Ranges of Results |
|---|---|
| Carbon Percentage | 86-89% |
| Percentage Volatiles | 2-3% |
| Percentage Sulfur | 2.4-2.8% |
| Ash at 593.3° C. (unozidized) | 9-11% |
| Iodine Number | 62 |
| PH | 7.12 |
| Carbon Tetrachloride Absorption | 3.0-6.1% |

TABLE 3

| Component | Weight Percentage |
|---|---|
| Copper Oxide | 0.01 |
| Ferric Trioxide | 0.95 |
| Zinc Oxide | 1.45 |
| Calcium Oxide | 0.37 |
| Magnesium Oxide | 0.06 |
| Aluminum Trioxide | 1.29 |
| Silicon Dioxide | 3.11 |
| Titanium Dioxide | 1.40 |
| Manganese Oxide | 0.05 |
| Other | 0.31 |
| Total | 9.00 |

TABLE 4

| Mesh Size | Percentage Retained On Sieve |
|---|---|
| 10 | — |
| 18 | 3 |
| 30 | 9 |
| 35 | 5 |
| 40 | 7 |
| 60 | 23 |
| 100 | 18 |

TABLE 4-continued

| Mesh Size | Percentage Retained On Sieve |
|---|---|
| 140 | 16 |
| 200 | 8 |
| 270 | 5 |
| 325 | 3 |

Oil produced from cold water condensation of the final gas stream and taken from the liquid outlet of the final condenser in combination with oil from the separator was tested for various properties and can be characterized as a light crude oil similar to fuel oil. The specifications of the oil are shown below in Table 4, including the oil's flashpoint, total halogen content, sediment and water content, viscosity, heat content, PCB content, API Gravity at 15.5° C. and sulfur content. In addition, the trace metal analysis of metals in ppm for the oil is shown below in Table 5.

TABLE 5

| Test | Results |
|---|---|
| Flashpoint | 10° C.: closed cup, 52.8° C.: open cup |
| Total Halogens | 25-50 ppm |
| Sediment and Water | 0.4% by volume |
| Viscosity | 35 ssu at 37.8° C. |
| Heat Content | 18,100 BTU/lb |
| PCB Content | <0.8 ppm (detection limit) |
| API Gravity at 15.5° C. | 14.7 |
| Sulfur Content | 0.6-0.8% |

TABLE 6

| Element | Ppm |
|---|---|
| Chromium | 0.67 |
| Cadmium | <0.01 |
| Vanadium | <0.1 |
| Calcium | 0.3 |
| Sodium | 0.3 |

The oil may be used on its own or blended with No. 6 oil as an industrial boiler fuel. Further, light ends (gasoline) may be further split from the heavy ends (diesel) by further downstream separation processing.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A tire pyrolysis system, comprising:
 (a) a pyrolysis reactor having a tire shreds inlet, a solids removal outlet and a gas stream removal outlet;
 (b) at least one heating element in heat exchange relation with the pyrolysis reactor;
 (c) a separator having a gas stream inlet in communication with the gas stream removal outlet of the pyrolysis reactor, a liquid outlet, at least one oil sprayer having a sprayer inlet in an upper portion of the separator and a non-condensed gas outlet; and
 (d) an auger having an inlet and an outlet, the inlet of the auger being in communication with the solids removal outlet of the pyrolysis reactor.

2. The tire pyrolysis system according to claim 1, further comprising a tire shreds feeding mechanism in communication with the tire shreds inlet of the pyrolysis reactor.

3. The tire pyrolysis system according to claim 1, further comprising a carbon black separation system having an inlet in communication with the outlet of the auger.

4. The tire pyrolysis system according to claim 3, wherein the carbon black separation system comprises at least one carbon black separator having a carbon black outlet, and a roller mill in solids communication with the carbon black outlet of the at least one carbon black separator.

5. The tire pyrolysis system according to claim 4, wherein the carbon black separation system further comprises a screener and a bagging system in solids communication with the roller mill.

6. The tire pyrolysis system according to claim 1, wherein the carbon black separation system comprises at least one trough auger.

7. The tire pyrolysis system according to claim 6, wherein the at least one trough auger in the carbon black separation system has a fighting having projections extending from the fighting to enhance tumbling action and agglomeration of small fiberglass particles.

8. The tire pyrolysis system according to claim 1, wherein the auger is a trough auger.

9. The tire pyrolysis system according to claim 1, wherein the pyrolysis reactor is a continuous pyrolysis reactor.

10. The tire pyrolysis system according to claim 9, wherein the pyrolysis reactor comprises a pin auger.

11. The tire pyrolysis system according to claim 1, wherein the solids removal outlet of the pyrolysis reactor comprises a flexible assembly which is capable of compensating for thermal expansion of the reactor during pyrolysis.

12. The tire pyrolysis system according to claim 11, wherein the flexible assembly comprises a trolley adjustably suspended by a support structure, the trolley being connected by a cable to the solids removal outlet of the pyrolysis reactor.

13. The tire pyrolysis system according to claim 1, further comprising airlocks at the tire shreds inlet and the solids removal outlet of the pyrolysis reactor and at the inlet and outlet of the auger.

14. The tire pyrolysis system according to claim 13, wherein the movement of the airlocks is timed.

15. The tire pyrolysis system according to claim 1, wherein the at least one heating element is at least one burner having a gas inlet and an effluent gas outlet, the gas inlet being in communication with the non-condensed gas outlet of the separator.

16. The tire pyrolysis system according to claim 15, wherein the effluent gas outlet of the at least one burner is in fluid communication with an inlet of a heat exchanger for cooling effluent gas from the at least one burner and the heat exchanger has an outlet in fluid communication with the auger such that cooled effluent gas can be injected into the auger.

17. The tire pyrolysis system according to claim 1, wherein the sprayer inlet is in fluid communication with the liquid outlet of the separator such that at least a portion of oil condensed in the separator may be introduced into the separator through the at least one oil sprayer.

18. The tire pyrolysis system according to claim 1, further comprising a sludge removal system having an inlet in fluid communication with the liquid outlet of the separator, a sludge outlet, a screen and one of a pulverizer or a delumper.

19. The tire pyrolysis system according to claim 1, further comprising a vent line in communication between the screen and an inlet of a condensor having an inlet which is in communication with the non-condensed gas outlet of the separator.

20. The tire pyrolysis system according to claim 19, wherein the sludge outlet of the sludge removal system is in communication with the pyrolysis reactor.

21. The tire pyrolysis system according to claim 1, further comprising a condenser having an inlet in communication with the non-condensed gas outlet of the separator and a gas outlet in communication with a flare.

22. The tire pyrolysis system according to claim 1, further comprising a condenser having an inlet in communication with the non-condensed gas outlet of the separator and a gas outlet, wherein an inlet of a pressure adjusting source is in communication with the gas outlet of the condenser and the pressure adjusting source is capable of maintaining constant reactor pressure in the pyrolysis reactor.

23. The tire pyrolysis system according to claim 22, wherein the pressure adjusting source comprises a blower having an inlet in communication with the outlet of the condenser and an outlet in communication with a gas flow control valve.

24. The tire pyrolysis system according to claim 23, wherein the gas flow control valve is a butterfly valve.

25. The tire pyrolysis system according to claim 1, further comprising an expansion tank having an inlet in communication with the gas stream removal outlet of the pyrolysis reactor and with the gas stream inlet of the separator, wherein the expansion tank comprises at least one movable paddle capable of preventing accumulation of solids in the expansion tank.

* * * * *